June 16, 1942.   C. W. INGELS   2,286,810

LEVEL INDICATOR FOR VIEW FINDERS

Filed April 23, 1940

Inventor
Clarence W. Ingels
by Wright, Brown, Quinby May
Attys.

Patented June 16, 1942

2,286,810

UNITED STATES PATENT OFFICE 2,286,810

LEVEL INDICATOR FOR VIEW FINDERS

Clarence W. Ingels, St. Albans, N. Y.

Application April 23, 1940, Serial No. 331,119

4 Claims. (Cl. 88—1.5)

This invention relates to a level indicator for a view finder such as is commonly used on cameras, special reference being had to view finders of the eye-level type. Such view finders customarily consist of two spaced lenses, the eye-piece being a small convex lens and the objective being a larger concave lens. The field of vision of finders of this type is usually defined by a rectangular aperture in a mask or screen at or near the objective lens. The finder is mounted so that the sides of this aperture are parallel to the corresponding edges of the portion of the film to be exposed in the camera.

It is an object of the present invention to provide a level device for such a finder, this level device including elements normally located at or near the side edges of the field of vision, the level indicator including means for automatically moving or projecting one or the other of such elements from its side edge toward the center line of the field of vision so that the element comes conspicuously into a view as a warning to the operator when the finder, and hence the camera, is laterally tilted. The level device is preferably located adjacent to one or the other of the lenses of the finder, the objective lens being usually preferred.

For a more complete understanding of the details of certain embodiments of the invention, reference may be had to the following description thereof, and to the drawing of which—

Figure 1:
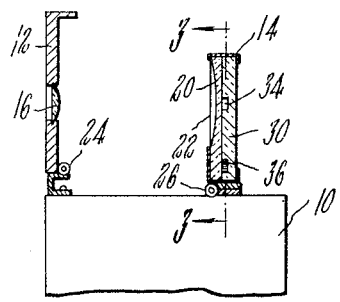
Figure 1 is a sectional view of a finder having a level device attached thereto.
Figure 2:
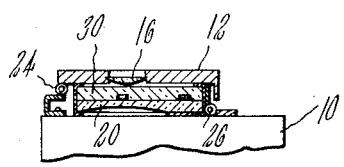
Figure 2 is a similar view, the finder being in its folded position.

As indicated in Figure 1, a view finder of the eye-level type may be mounted on a camera 10. This finder may comprise two frame members 12 and 14 which support, respectively, a convex eye-piece 16 and a concave objective lens 20. The lens 20 is considerably larger than the eye-piece 16 and fills a rectangular aperture 22 in the frame 14 which defines a field of vision corresponding to the image cast on the sensitized film within the camera when the exposure is being made. The members 12 and 14 are adapted to be swung down into the horizontal position shown in Figure 2 when not in use, hinges 24 and 26 being provided for this purpose.

Figure 3:
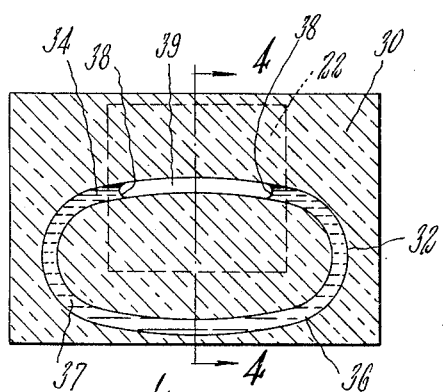
Figure 3 is a section on the line 3—3 of Figure 1, shown on a larger scale.
Figure 4:
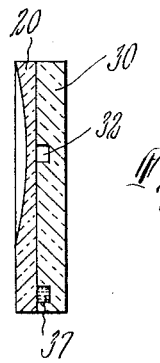
Figure 4 is a section on the line 4—4 of Figure 3.
Figure 5:
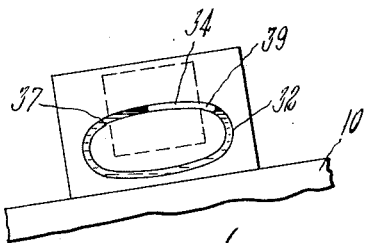
Figure 5 is a front elevational view of the objective member of a finder having a level indicator therewith, the member being shown in a laterally tilted position.

According to the invention, a level indicator is mounted next to the objective lens 20. This indicator consists essentially of a plate 30 having a duct 32 formed therein in the shape of a closed curve such as is indicated in Figure 3 by way of example. This duct has an upper portion 34 which passes across the field of vision defined by the aperture in the screen 22 and a lower portion 36 below such aperture. As indicated in Figures 1 and 4, the side walls of the upper portion 34 of this duct are plane and parallel, both walls being preferably parallel with the outer face of the plate 30 so that the level device will permit vision therethrough with the least possible distortion. The duct 32 is partially filled with a suitable liquid 37. The lens 20 and the plate 30 are preferably of colorless transparent material or materials such as glass, Celluloid, a synthetic resin, or other equivalent material suitable for the purpose. The liquid 37 in the duct is preferably of different appearance so as to contrast with the material or materials of the lens 20 and plate 30. For example, water, alcohol, oil, carbon tetrachloride, or other liquids can be used for this purpose, a soluble dye being employed to color the liquid so as to make it conspicuous in comparison with the lens and plate. Mercury may also be employed if desired, but in such case the air in the unfilled portion of the duct 32 should be replaced by an inert gas in order to avoid the formation of an oxidized film on the free surfaces of the mercury. According to the invention, the area of cross-section of the upper portions 34 of the duct, especially the portion which extends across the field of vision of the finder, should be so related to the surface tension characteristics of the liquid employed that the free surfaces of the liquid will be in the form of menisci 38 separated by an empty space 39 as indicated in Figure 3. The quantity of liquid inserted in the duct is preferably such that the menisci 38 will be at or near the respective side edges of the aperture 22 in the screen when the finder is in its normal upright position. When the finder is laterally tilted, it is evident that the meniscus on one side will advance toward the center line of the apparatus and the other meniscus will retreat beyond the adjacent side edge of the aperture as indicated in Figure 5. The projecting column of liquid is at once apparent to the observer looking through the eye-piece so that warning is thus given of any lateral tilt of the camera which can at once be corrected.

Figure 6:
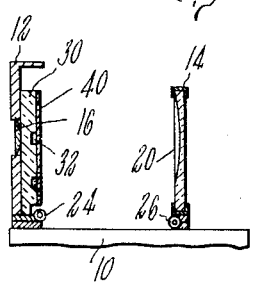
Figure 6 is a sectional view of a finder having a level device attached to the eye-piece member of the finder.

The duct 32 may be readily formed in the level device by cutting, molding, or otherwise forming in a face of the plate 30 a channel having a plane bottom, particularly in the upper portion 34 thereof. The duct is then closed by securing against the face of the plate a cover plate which may be the lens itself as indicated in Figure 1, or may be an additional plate 40 of uniform thickness as indicated in Figure 6. The parts of any composite plate need not be of the same material. For example, the plate 20 may be of glass, the plate 30 being of some material which can be more readily molded or machined for the formation of a channel therein.

The level device illustrated in Figure 1 is shown as a part of the objective member of the finder. If preferred, the level device may be adjacent to or a part of the eye-piece member as indicated in Figure 6. In such case, the aperture for the lens 16 is smaller than the aperture for the objective lens. Hence the length of the duct 32 can be considerably less than that indicated in Figure 3, but the arrangement of the duct and principle of operation are the same. When the finder is laterally tilted from its normal position, a column of liquid will be automatically projected from one side or the other of the eye-piece aperture toward the center line thereof so as to be readily noticed by the observer.

Figure 7:
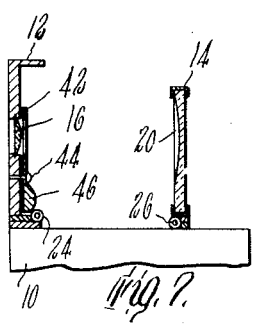
Figure 7 is a sectional view of a finder having a level indicator of a modified form.
Figure 8:
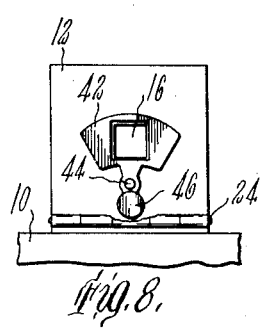
Figure 8 is an elevational view of the eye-piece member of the finder shown in Figure 7, together with the level device thereon.

Instead of employing a column of liquid in a curved duct as hereinbefore described, I may employ a pendulum type of level indicator such as is indicated in Figures 7 and 8. As therein shown, a shutter element 42 is pivotally mounted to rock about a pivot pin 44 located below the center of the aperture for the eye-piece 16. The shutter 42 may conveniently be fan-shaped with a central aperture normally registering with the apparatus of the eye-piece as indicated in Figure 8. The shutter 42 is preferably in the form of a thin, lightweight sheet. Below the pivot pin 42 is a suitable weight 46 of sufficient mass to maintain the shutter in an upright position regardless of any lateral inclination of the finder. Thus, if the finder be laterally tilted from its normal upright position, the shutter will then be out of registry with the aperture for the eye-piece. In other words, one or the other of the side edges of the aperture in the shutter element 42 will automatically move toward the center line of the eye-piece aperture, thus indicating to the observer the lateral tilt of the finder.

It is evident that various other modifications and changes in the embodiment of the invention may be made without departing from the spirit or scope thereof as defined in the following claims.

What I claim is:

1. In a view finder having a pair of spaced lenses, a level indicator adjacent to one of said lenses comprising a plate of transparent material having a duct therein formed in a closed curve, the upper part of said duct being arranged to extend across the used portion of said one lens and having plane side walls in planes perpendicular to the axis of said one lens, and a quantity of liquid partially filling said duct, the cross-section of the upper part of said duct being of such area as to cause said liquid to terminate in menisci having an empty space between them in the upper part of the duct.

2. In a view finder having a rectangular field of vision, a level device comprising a normally upright plate of transparent material having therein a duct in the shape of a closed curve the upper portion of which extends across the field of vision, the upper portion of which duct has side walls in planes parallel to the faces of said plate, and a quantity of liquid partially filling said duct.

3. In a view finder having a rectangular field of vision, a level device comprising a normally upright plate of transparent material having therein a duct in the shape of a closed curve the upper portion of which extends across the field of vision, the upper portion of which duct has side walls in planes parallel to the faces of said plate, and a quantity of liquid partially filling said duct, the cross-section of the upper portion of said duct being so related to the surface tension of the liquid that the free surface of the liquid is in the form of two menisci separated by an empty space in the upper portion of the duct when the device is in its normal position.

4. In a view finder having a rectangular field of vision, a level device for a view finder, comprising a normally upright plate consisting of two layers of transparent material secured together face to face, said layers enclosing a duct in the shape of a closed curve, the upper portion of which duct extends across the field of vision and has plane parallel side walls, one of said layers having its outer face curved so that the plate acts as a lens, and a quantity of liquid partially filling said duct.

CLARENCE W. INGELS.